UNITED STATES PATENT OFFICE.

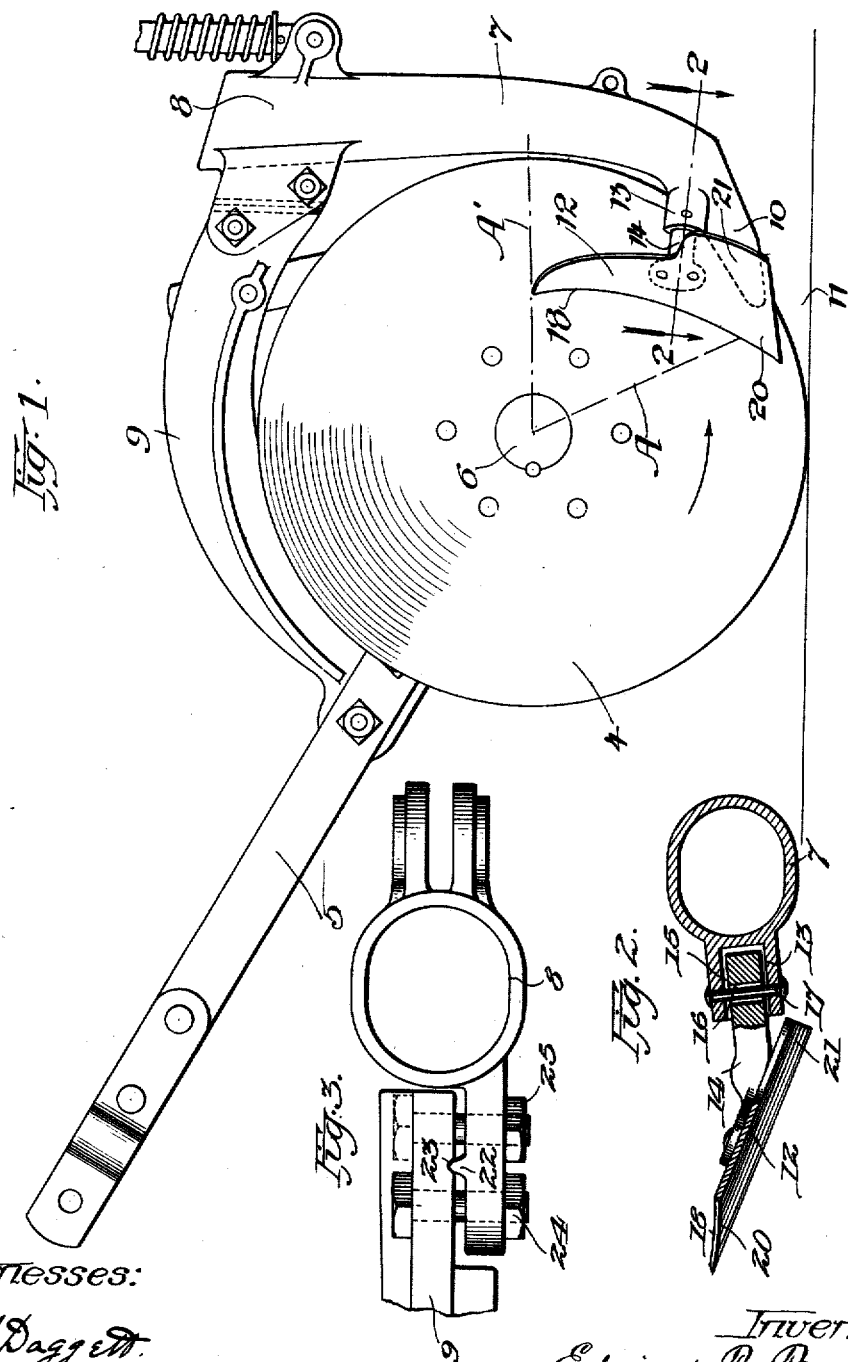

EDWIN R. BEEMAN, OF MINNEAPOLIS, MINNESOTA, ASSIGNOR TO THE MONITOR DRILL COMPANY, A CORPORATION OF MINNESOTA.

SCRAPER FOR DISK FURROW-OPENERS.

997,175.            Specification of Letters Patent.      Patented July 4, 1911.

Application filed July 29, 1910. Serial No. 574,510.

*To all whom it may concern:*

Be it known that I, EDWIN R. BEEMAN, a citizen of the United States, residing at Minneapolis, in the county of Hennepin and State of Minnesota, have invented certain new and useful Improvements in Scrapers for Disk Furrow-Openers, of which the following is a specification.

In order that the scraper for the convex side of a disk may operate in the most efficient and satisfactory manner, it should be flexibly supported in the proper position and in proper relation to the disk, so that it may adjust itself easily and perfectly to any inequalities in the shape of the disk or to changes of its position when in use, so that the scraper will always act on the disk at the correct angle and make contact with the face of the disk, along its entire edge.

It will be understood that when a disk furrow opener is used for planting grain, it is provided with a downwardly projecting boot immediately adjacent and behind the disk, said boot being hollow and projecting down very close to the bottom of the furrow, so that the grain which is dropped down through the boot will be deposited immediately behind the disk and at the bottom of the furrow. In order to keep the disk clear from dirt and mud, and in order to prevent the latter from getting into and filling the boot, and in order to prevent the dirt and mud from clogging between the boot and the disk, the scraper should be carried in such position as to clean the disk at a point somewhat in advance of the front of the boot.

In the manufacture of disks for furrow openers, it is impossible to make them so that they will rotate about their centers without some wabbling, unless a great deal of extra expense and labor are entailed. It is particularly true that a certain amount of wabbling of the disks will be expected when they are flexibly supported on their hubs, and because they must rotate when in use. It is therefore seen that a scraper should be flexibly supported and preferably pivoted with its axis of movement near its center, so as to properly perform its functions.

In order to be most efficient and satisfactory in service, a scraper should be so designed and supported with respect to the disk that the mud and dirt will be removed with a shearing action and thrown upwardly and backwardly as they are removed, and so that the scraping action will not take place on a radial line of the disk, but rather on a line which does not pass through the center of the disk; and preferably one which passes rearwardly of the center of the disk.

The objects of this invention are, to provide a scraper which may be carried low down, preferably by the boot, but which shall be supported high enough up on the boot instead of at its toe to enable the scraper to properly adjust itself to the disk, and so as to relieve the toe of the boot from excessive strain; to provide a scraper which will always automatically and perfectly adjust itself to the disk; which may be initially adjusted so as to most perfectly seat against the disk; to provide a scraper of such shape, and to support the same with respect to the disk, in such manner that mud and dirt will be most easily sheared off and removed from the disk and thrown backwardly and upwardly in a manner to properly clear the boot and disk, so as not to clog in between them; and in other ways and manners to improve it generally.

Other objects and uses will appear from a detailed description of the invention, which consists in the features of construction and combination of parts hereinafter described and claimed.

In the drawings, Figure 1 shows a side elevation of an improved type of single disk furrow opener, having my improved scraper attached thereto, with the scraper mounted on a type of boot which enables the scraper to be easily and perfectly adjusted when initially applied to the disk; Fig. 2 shows a cross section through the scraper, support, and boot, taken on line 2—2 of Fig. 1, looking in the direction of the arrows, and showing how the scraper may be flexibly supported on the boot, although I do not restrict myself to such supporting means, except when specifically called for in the claims; and Fig. 3 shows a detail of the upper end of the boot and arm, showing one manner in which the boot may be adjustably supported, so that it may be swung back and forth to bring the scraper into proper contact with the disk.

Referring, now, to Fig. 1, a disk 4 may be rotatably attached in any suitable manner to a draw bar 5. In general, the attachment will necessarily be one permitting a slight amount of wabbling about the hub 6. A boot 7 is carried at its upper end 8, as by means of an arm 9 attached thereto in any way desired, although such attachment should be a rigid one when completed. The toe of the boot 10 extends down near the bottom 11 of the furrow and projects forwardly on the inner side of the disk and adjacent thereto.

My improved scraper 12 is attached to the lower portion of the boot in such a way that it may have a certain amount of motion with respect thereto, but in such a way that its edge shall make contact for its entire length with the surface of the disk. The preferred form of support comprises a hollow boss 13 cast onto the lower portion of the boot, although, as will be shown, this attachment should be above the toe of the boot. A shank 14 is rigidly attached to the scraper, as by riveting, and enters the hole 15 in the boss 13, and may be provided with a hole 16 through which a pin 17 passes to hold the shank within the boss. Both the holes for the shank and the pin should be large enough to form loose connections, so that the shank may have a certain amount of adjustment motion within the hole of the boss. It will be seen that this adjustment may be in any direction, but that it need not be of great extent.

The scraper is so formed that its scraping or working edge 18 extends backwardly and upwardly, preferably in the form of an arc and not on a radius of the disk. The exact shape of the curve of the working edge of the scraper will depend upon the shape of the disk and the preferred angle which the scraper makes with the disk, as well as the backward tilt which is given to the scraping or working edge 18. It will be understood that these matters may be adjusted to suit the requirements and that the scraping or working edge may be even made radial with respect to the disk, although it will be shown that a certain advantage arises from having it pass rearwardly of the center of the disk. It will furthermore be understood that the best results are attained when the entire body of the scraper lies to the rear of a vertical line drawn through the center of the disk, and such construction is illustrated. Furthermore, by forming the working edge of the scraper in an arc, substantially as shown,—that is, an arc of nearly circular form, but of slightly sharper curvature in its upper than in its lower portion; and by supporting the scraper with respect to the disk, substantially as shown,— that is, with the upper portion of its working edge tilted slightly backward while the lower portion thereof extends substantially forward; and by placing the scraper so that its lower front corner is somewhat to the rear of a vertical line drawn through the center of the disk; and by attaching the shank to the scraper so that it lies in a substantially horizontal position,—certain peculiar and desirable results are attained.

In the drawings, I have illustrated a radial line A on the disk, and said line will rotate with the disk as the latter rotates, when in use, in the direction of the arrow. In the position shown, this line intercepts the edge 18 of the scraper near its lower point and with a long radius. That is, the portion of the disk represented by this line is first cleaned near its outer periphery. Then as the disk rotates around in the direction of the arrow the portion on this line will continue to come into contact with new and higher portions of the edge 18 and at continually decreasing radii until the line has moved around to the position A', at which time the minimum radius of the line will be in contact with the edge 18. A study of the above action shows that the scraping takes place with a shearing action in a backward and upward manner and not along a radius of the disk. This scraping action may be compared to that in which a man draws a razor forward while shaving, at the same time advancing it bodily. At least two desirable results accrue from this peculiar scraping action, as follows: First, the mud and dirt are thrown upwardly as well as rearwardly when removed from the disk, and thus prevented from entering or clogging the toe of the boot; and, second, the power consumed in the scraping operation is greatly reduced, as is found by actual test. This is largely because of the "drawing" action caused by the non-radial scraping.

By attaching the shank to the scraper near its central portion, the latter may rotate about said shank for purposes of adjustment until the rotating forces above the shank equalize those below it. It would not be possible to secure the best adjustment if the shank were attached too near either the upper or lower end of the scraper, for then the other end would tend to push away from the disk and remain away. At the same time, by placing the shank near the center of the scraper, said shank may be attached to the boot some distance from its toe, and at the same time the lower point 20 of the scraper may be approximately on a line with or even slightly below the toe of the boot. In this manner the forces which hold the scraper in position do not come upon the boot at its lower end, which is necessarily the weakest, but they come upon it higher up where it is stronger and where they act at a lesser radius from the upper end of the boot where it is supported. This reduces the twisting force which comes upon the boot, because the force is acting at a shorter radius and the boot may be of lighter construction for a given amount of work or resistance.

In order to more effectually throw the dirt and mud up past the lower end of the boot, the lower end of the scraper may be wider than its upper portion, projecting out in the form of an ear 21, so as to effectually protect the lower end of the boot.

Obviously, when the edge of the scraper is made of a given contour, the scraper should be held against the disk at a certain angle in order to insure the best scraping results. If held at too small an angle, only the central portion of the edge will come into contact with the disk, leaving the upper and lower ends in poor contact therewith; or, if the angle is too great, only the upper and lower ends of the scraping or working edge will make proper contact with the disk, relieving the central portion from its proper share of the total pressure. In order to most perfectly hold the scraper against the disk, the angle of contact between the two should be adjustable. Said adjustability may be easily accomplished by slightly rotating the boot axially, or otherwise with respect to the arm 9, which is attached to the draw bar, which in turn carries the disk. Such an adjustment I have illustrated in Figs. 1 and 3. In Fig. 3 I show the upper end of the boot as provided with a rib 22 which seats within a groove 23 of the arm; bolts 24 and 25 are provided, one on each side of the rib, so that by tightening one of the bolts and loosening the other the boot may be twisted over in the one direction or the other with respect to the arm, and, therefore, with respect to the disk. This will cause a change of the angle at which the scraper makes contact with the disk, thus securing the desired adjustment.

The necessity of providing a scraper which will properly remove mud or dirt from the convex side of the disk will be appreciated when it is considered that frequently as many as twenty-four or even more disks are supported side by side in one plow, and not more than five or eight inches apart. If the mud or dirt is not properly removed, that is, thrown up and past the boots in the proper manner, it is liable to clog between two adjacent disks or between the convex side of the disk from which it is removed and the rear portion of the disk next adjacent its convex side.

Although in this application I have illustrated one method of securing an angular adjustment of the boot with respect to the disk, still I do not claim such construction in this application, it being embodied and disclosed more completely in another application with which I am familiar, relating more particularly to the frame construction of single disk furrow openers.

I claim:

1. In combination with the boot and disk of a furrow opener, a scraper therefor comprising a relatively long upright member set at a suitable angle with respect to the disk and in advance of the boot, and having its working edge curving rearwardly and upwardly from its lower forward portion, a shank rigidly attached to the rear face of the scraper near its central portion, and a movable connection between the shank and the lower portion of the boot, substantially as described.

2. In combination with the boot and disk of a furrow opener, a scraper having a curved working edge and means for supporting the same on the lower portion of the boot to permit free movement thereof in all directions, substantially as described.

3. In combination with the boot and disk of a furrow opener, a scraper, a hollow boss on the front portion of the boot, a shank rigidly attached to the scraper in its central portion, and means for loosely supporting the shank within the hollow boss, substantially as described.

4. In combination with the boot and disk of a furrow opener, a scraper of the class described, and supporting means therefor comprising a hollow boss on the forward portion of the boot substantially above its toe, and a shank rigidly attached to the scraper near its central portion and loosely entered and secured into the hollow boss, substantially as described.

5. In combination with the boot and disk of a furrow opener, a scraper, a hollow boss on the forward portion of the boot, a shank attached to the scraper near its central portion, and means for loosely supporting the shank within the hollow boss, substantially as described.

6. In combination with the boot and disk of a furrow opener, a scraper, a hollow boss on the forward portion of the boot, a shank rigidly attached to the scraper near its central portion, and having its end entered within the hollow boss, and a pin entered through the hollow boss and loosely through the shank to permit the scraper to secure the necessary adjustment against the disk, substantially as described.

EDWIN R. BEEMAN.

Witnesses:
W. L. Warner,
A. R. Tarbox.